April 18, 1961   S. R. BIRLESON ET AL   2,979,869
CONTROL SYSTEM FOR GRINDING MACHINES
Filed Oct. 30, 1957   7 Sheets-Sheet 1
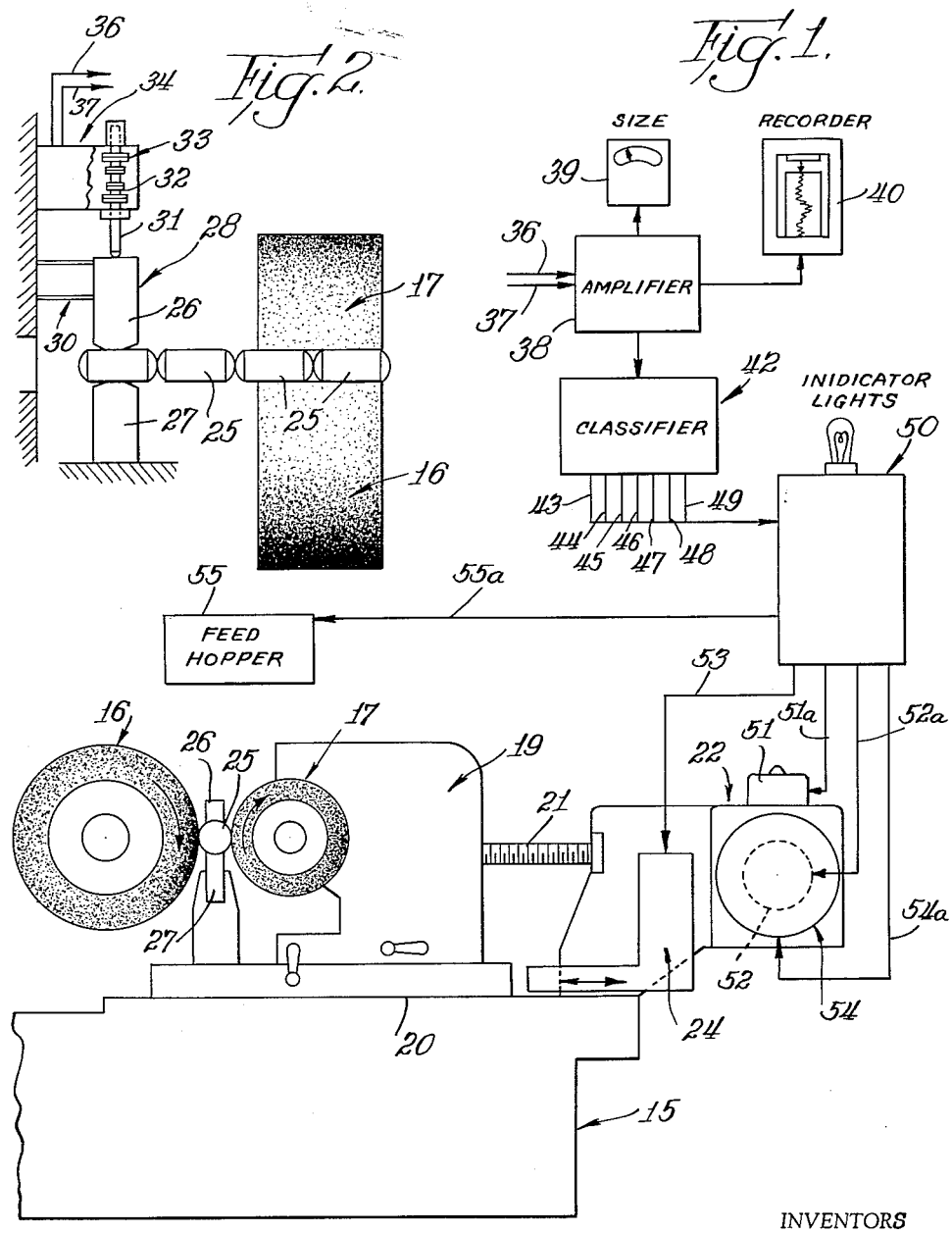
INVENTORS
STANLEY R. BIRLESON,
HUGH H. CAMPBELL &
HAROLD R. DOBB
ATT'YS.

April 18, 1961   S. R. BIRLESON ET AL   2,979,869
CONTROL SYSTEM FOR GRINDING MACHINES
Filed Oct. 30, 1957   7 Sheets-Sheet 2

INVENTORS
STANLEY R. BIRLESON,
HUGH H. CAMPBELL &
HAROLD R. DOBB
BY
ATT'YS.

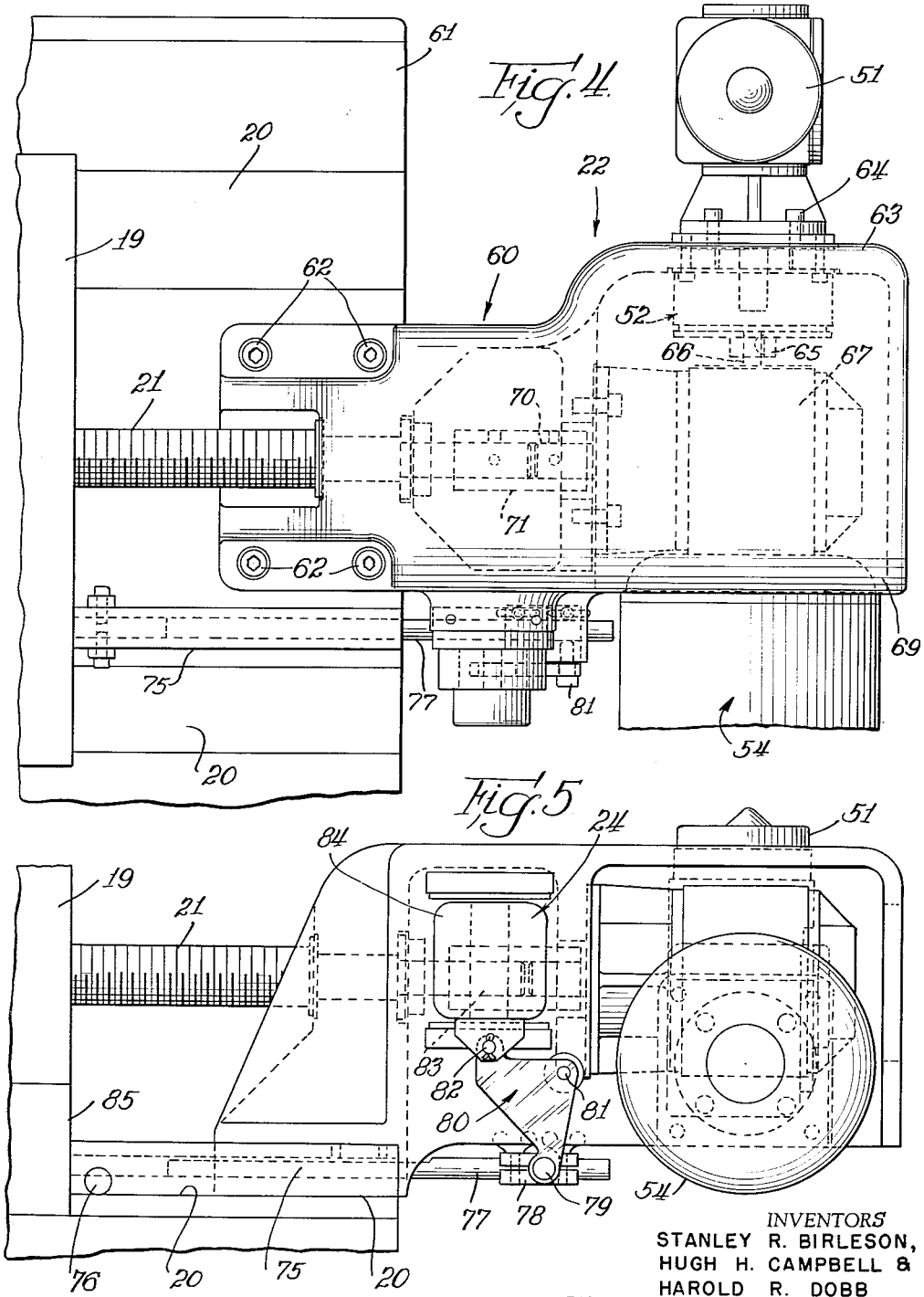

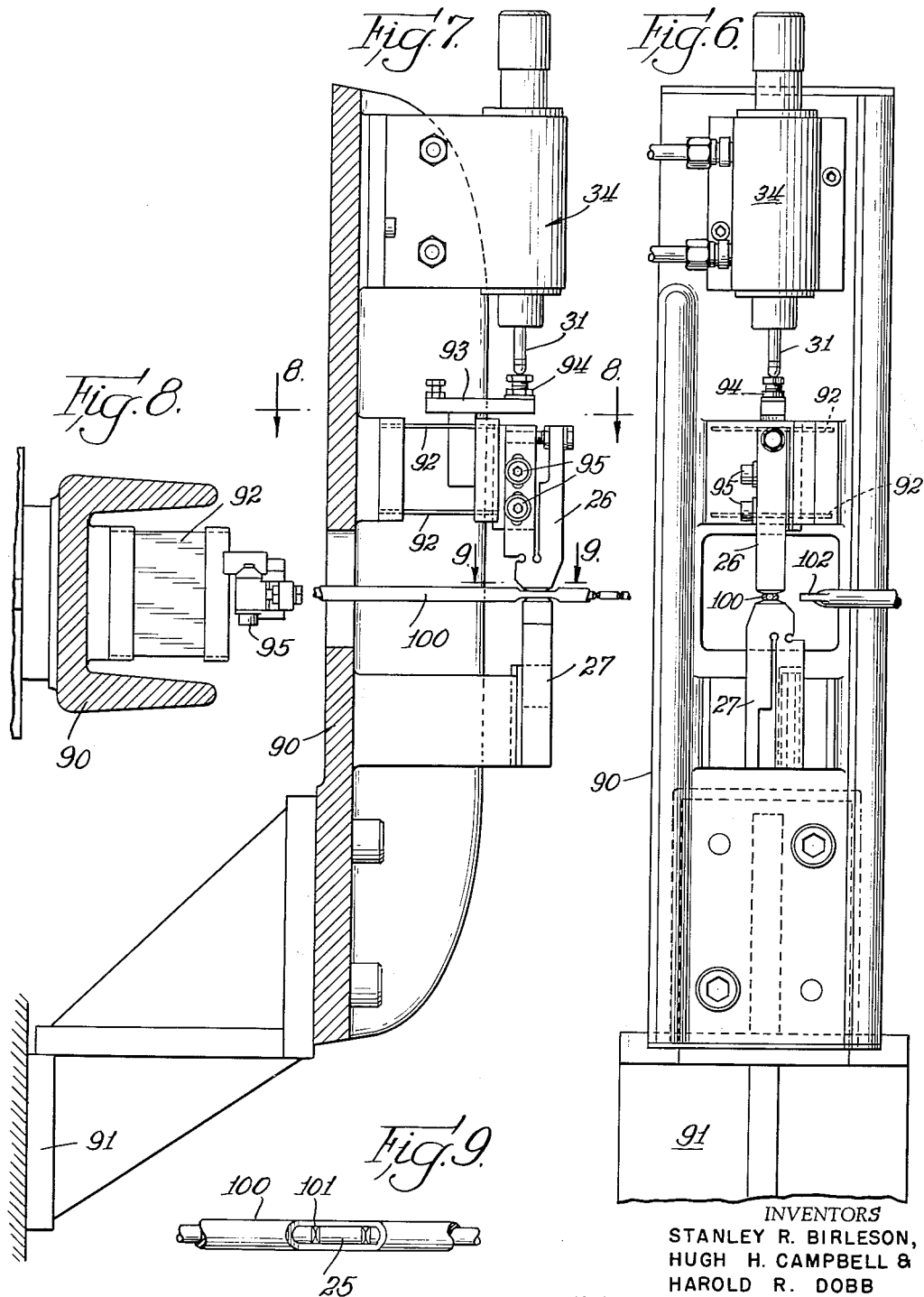

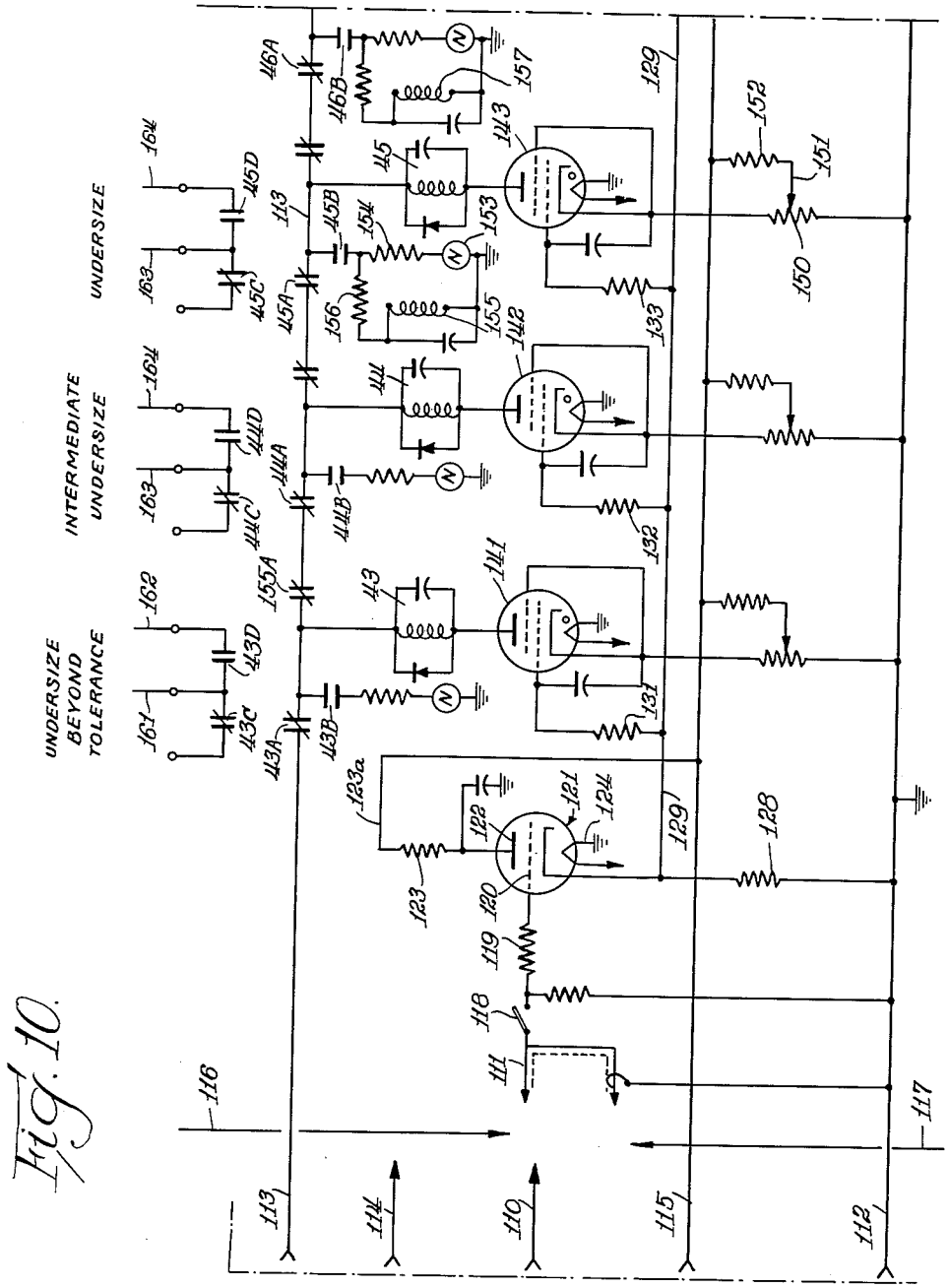

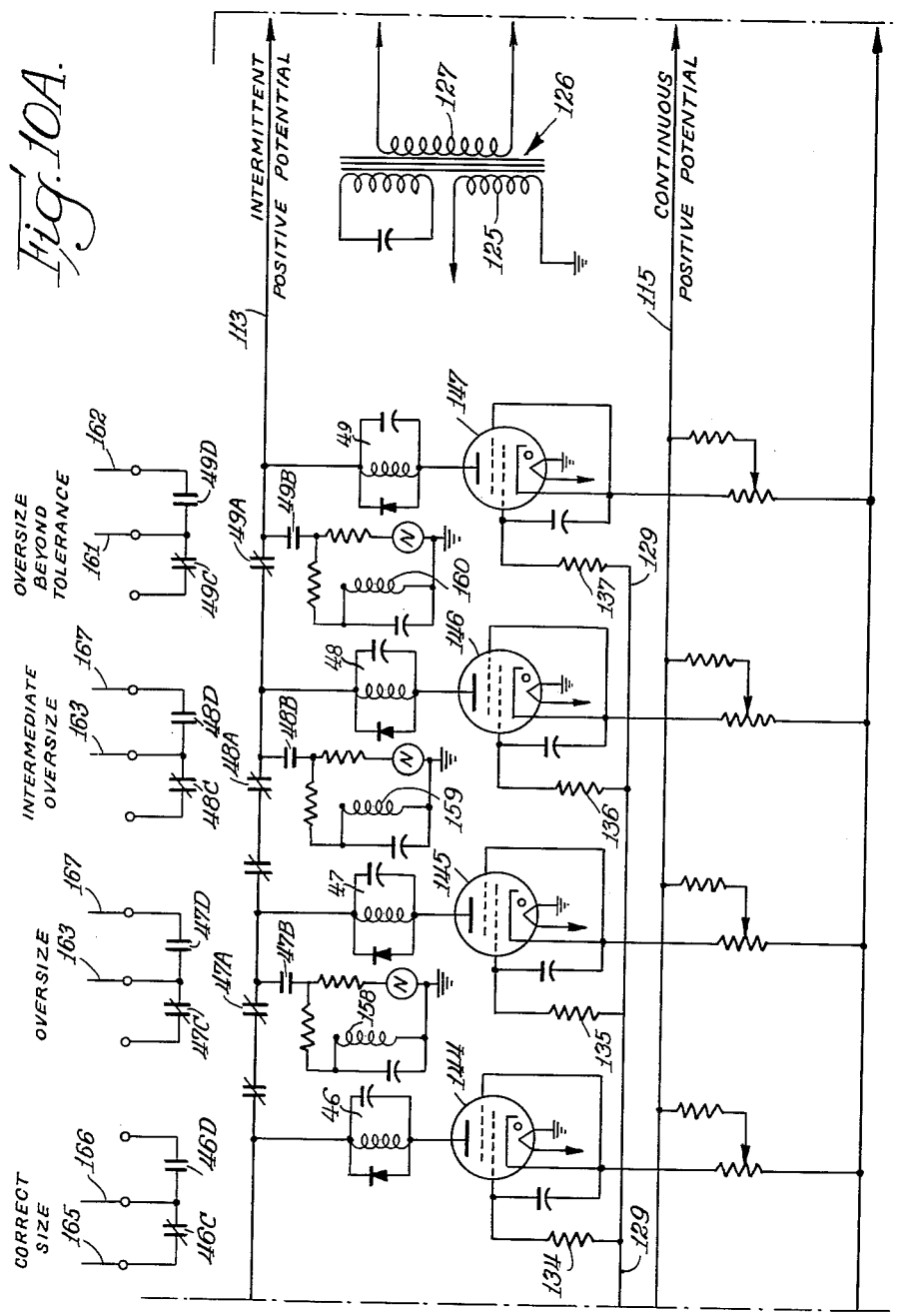

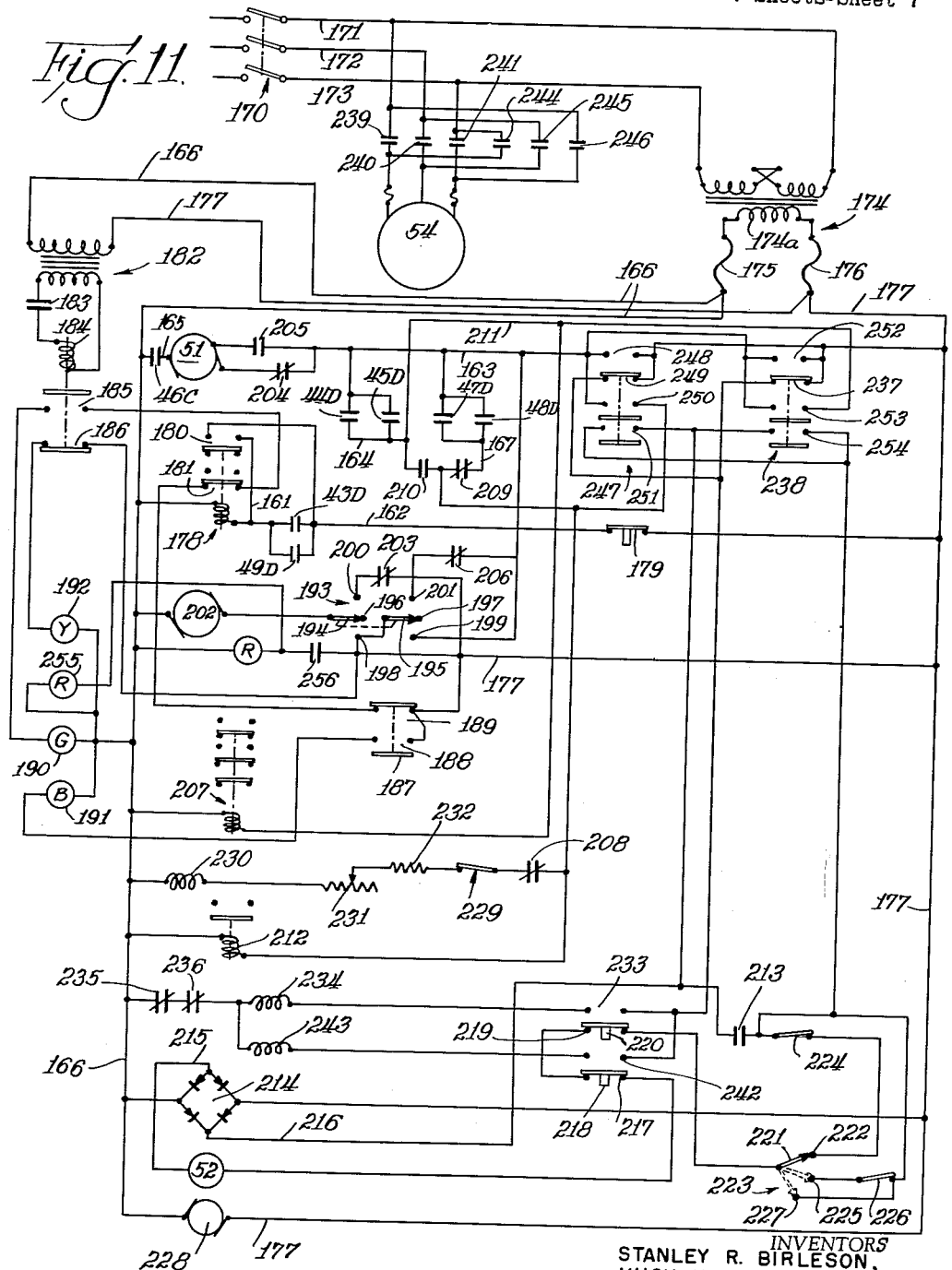

United States Patent Office

2,979,869
Patented Apr. 18, 1961

2,979,869

CONTROL SYSTEM FOR GRINDING MACHINES

Stanley R. Birleson, Muskegon, Hugh H. Campbell, Muskegon Heights, and Harold R. Dobb, Muskegon, Mich., assignors to The Kaydon Engineering Corp., Muskegon, Mich., a corporation of Michigan Filed Oct. 30, 1957, Ser. No. 693,426

6 Claims. (Cl. 51—165)

This invention relates to automatic control equipment for machine tools and more particularly to automatic means for gauging, recording, and controlling the outside diameter of products fed through centerless grinders and the like; indication of change in such diameter automatically altering the relative position of grinding and regulating wheels to compensate for size change.

In greater particular, the improved control means and mechanisms of our invention are directed to the provision of suitable automatic gauging and size control equipment for the automation of machines and particularly for the production therein of cylindrical objects in centerless grinders. In addition to automatic product gauging, detection of size change, and responsive correction of relative position between grinding and regulating wheels which characterizes our invention, improved economic advantages are made possible through multiple machine operation by a single operator in the production of needle rollers, or like products, on through-feed centerless grinding equipment.

Briefly, the improved control means of our invention employs delicate gauge mechanism which records changes in outside diameter of cylindrical parts as they leave the wheels of a centerless grinding machine. Further, provision is made to utilize such gauging information to automatically correct relative position of the grinding and regulating wheels to compensate for the indicated change. The automatic gauging and recording function is achieved by amplification of electrical signals generated by the passage of products through delicate gauge means. In one such gauge means, described hereinafter, mechanical displacement of a detecting contact disturbs electrical balance between magnetic windings in a detecting head to produce proportionate electric signals. Such mechanical displacement of the gauging head varies with the change in outside diameter of the steady stream of rollers and thus indicates a trend in diameter change. The electrical signals so generated thus vary with the mechanical displacement of the detecting head. With the change in needle roller diameter being normally in the magnitude of microinches, the resulting mechanical displacement of the detecting head is likewise very minute. As a result, the electric signal generated is very small and is, therefore, suitably amplified several thousand times and used in a magnified condition to operate a gauge meter, recording elements, and classifier means. The classifier selects the strength of the gauged signal according to its magnitude which is proportional to the change in outside diameter of the rollers being produced in the machine. The classified signal is then fed to suitable relay means to energize a correcting mechanism to compensate for either oversize or undersize rollers, or to shut down the machine, as required.

When the classifier has energized the proper relay, according to the amplified gauging signal, the actual mechanical shifting of the machine's regulating wheel is performed by an electro-mechanical feed arrangement which includes a solenoid operated hammer adapted to engage one end of the regulating wheel head; tapping of such head serving to overcome static friction to permit its accurate movement, as required. In order to provide for incremental feeding of the regulating wheel head, torsional loading of its related feed screw means is carried out in intermittent stages which, when coupled with intermittent tapping operation of the hammer, serves to advance the regulating wheel head suitably to minimize over correcting.

The main object of this invention is to provide a new and improved means for the automation of machine tools, particularly for the production of continuous through-feed products, such as cylindrical rollers.

Another important object of this invention is to provide a new and improved control means and system for automatically gauging and controlling diameter of products produced in centerless grinders.

Still another object of this invention is to provide a new and improved control means and system which automatically gauges and records trends in the change of outside diameter or cylindrical products leaving a centerless grinder and which utilizes such gauged information to automatically correct relative position of the grinding and regulating wheels to maintain the product diameter within predetermined limits.

Still another object of this invention is to provide new and improved automatic control means for producing uniform products in centerless grinders by providing a continuous gauging system productive of suitable information which is utilized to regulate relative position of regulating wheel in a centerless grinding machine.

Another object of this invention is to provide a new and improved means for moving the regulating head of a centerless grinding machine incremental distances to effect desired change in the outside diameter of needle rollers and like cylindrical products produced in a centerless grinding machine.

Still another object of this invention is to provide a new and improved electro-mechanical device for feeding the regulating head of a centerless grinder in micro-inch increments.

A further important object of this invention is to provide a gauging system for continuous measurement of the size of parts leaving the wheels of centerless grinding machines or the tool head of like machines.

Another important object of this invention is to provide an improved gauging system for use in the automatic control of centerless grinders and the like which is suitably dampened to ignore temporary changes in the diameter of cylindrical parts and thereby indicate the trend in size change of parts leaving such a machine.

A still further object of this invention is to provide a new and improved means to move massive machine parts very small distances by employing a means for overcoming the differential between running and static friction of such parts.

Another object is to provide an improved means for moving massive parts incremental distances, as aforesaid, in which an automatically energized hammer mechanism is embodied for overcoming static friction of the mass.

The above and further objects, features, and advantages of our invention will appear to those familiar in the art from the following detailed description and specification which are presented in conjunction with the preferred embodiment of our invention set forth in the accompanying drawings.

In the drawings:

Figure 1 is a schematic representation of the improved control means and system of our invention, viewing the grinding machine in side elevation;

Figure 2 is an additional schematic view in top plan of the grinding wheels and gauging system employed in the control means of this invention;

Figure 4 is a partial top plan view of the feed and hammer control unit employed in our present invention;

Figure 5 is a side elevational view of the feed and hammer control unit of means set forth in Figure 4;

Figure 6 is a front elevational view of the improved gauging means employed in our present invention;

Figure 7 is a side elevational view of the gauging means shown in Figure 6;

Figure 8 is a cross-sectional view taken substantially at line 8—8 of Figure 7 and looking in the direction of the arrows thereon;

Figure 9 is an enlarged view taken substantially at vantage line 9—9 of Figure 7, and looking in the direction of the arrows thereon, to illustrate an improved feed tube for use with the gauge means of Figures 6 and 7;

Figures 10 and 10a represent in conjunction a wiring diagram for the classifier unit employed in our present control means; and Figure 11 is a schematic wiring diagram of the hammer and feed control circuitry associated with the classifier circuit of Figures 10 and 10a.

Figure 3:
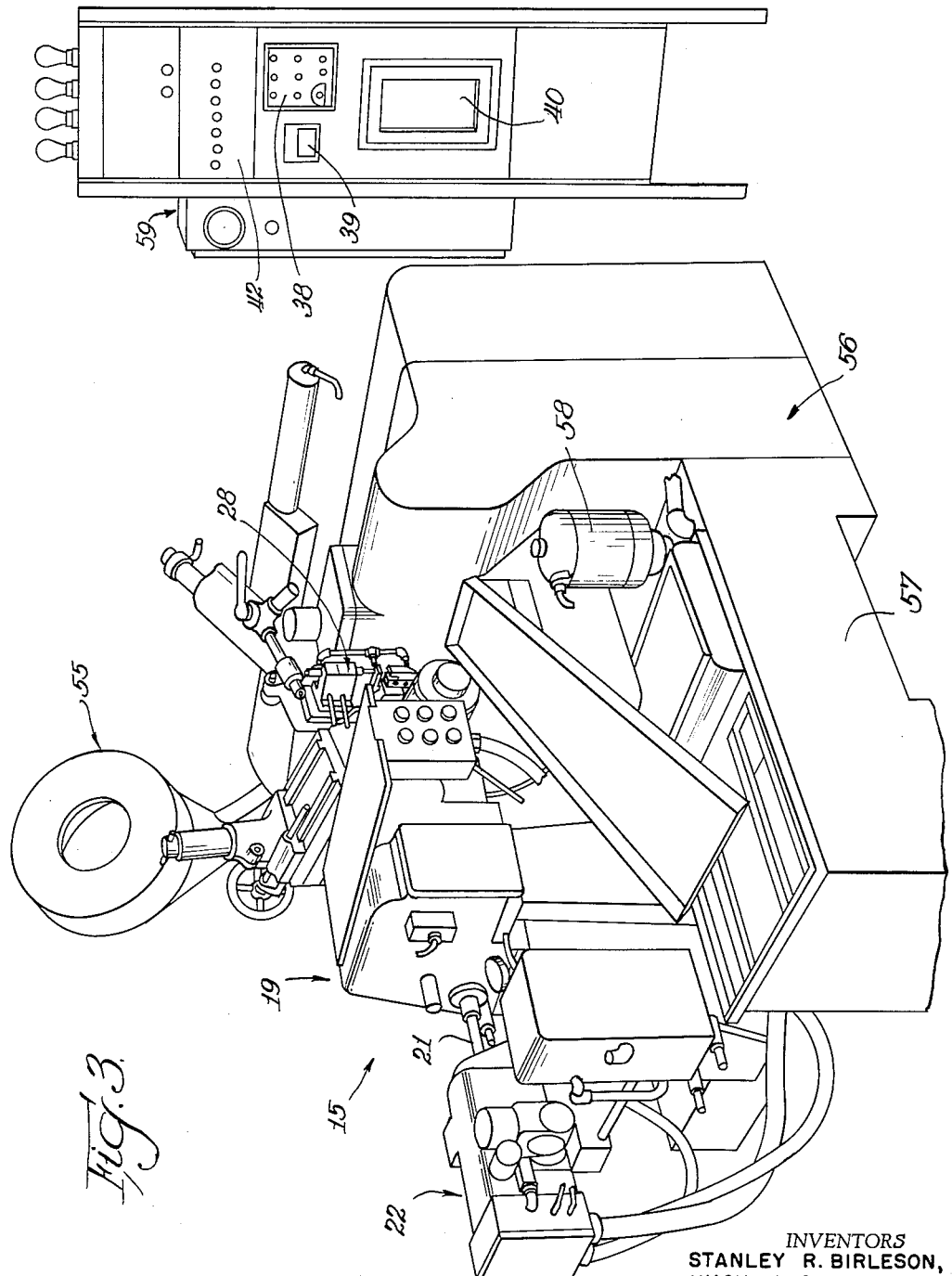
Figure 3 is a perspective view of a typical centerless grinder equipped with the improved control apparatus and means of our invention.

Looking now at Figures 1 and 2 of the drawings, it will be understood that the improved system and control means of our invention is schematically set forth therein. In particular, a centerless grinding machine, indicated generally by numeral 15, includes a rotatable grinding wheel 16 and a smaller regulating wheel 17. Regulating wheel 17 is carried by a slide head 19 which moves along ways 20, 20 in response to rotation of feed screw 21. Feed screw 21 is driven intermittently by a feed means 22 and a solenoid actuated hammer mechanism 24 is provided to periodically tap the slide head 19 to overcome its static friction of engagement with the slide ways 20. Such energization and actuation of hammer mechanism 24 is timed to cooperate with periodic operation of the feed screw.

As shown further in Figure 1, cylindrical work pieces 25 are fed through and between the two abrasive wheels 16 and 17 to emerge between an upper movable contact 26 and a lower stationary or reference contact 27 of a measuring gauge means, indicated generally by numeral 28 in Figure 2 of the drawings. While gauge means 28 shown, constitutes an electro-mechanical system, pneumatic gauges and other sensitive gauge systems are likewise available for this purpose. In any event the work pieces 25 are discharged from the grinder substantially as a steady stream, and diameter change is measured rapidly by the gauge means.

The gauge means 28 includes pantograph means 30 which supports the sensitive contact 26 so that movement of the latter is translated to a spindle 31 associated with magnetic coil means 32 and 33. Movement of the sensitive contact 26, with respect to the stationary or reference contact 27, is in response to change in diameter size of the stream of needle rollers passing between the two gauge contacts. This movement is reflected by the pantograph means 30 and corresponding movement of the spindle means 31 which disturbs the balance between the magnetic windings 32 and 33 in the gauge head 34. A signal results from this disturbance and such is transmitted via conductors 36 and 37 to the input side of an R-C amplifier unit 38.

The amplifier 38, as schematically represented in Figure 1 of the drawings, serves to magnify the minute electrical signal received from the gauge head 34. The amplified signal is then reflected on a visual size meter 39 and a size recorder unit 40. The amplified signal is also fed to a classifier unit, indicated generally by numeral 42.

The classifier unit detects the signal strength and selects one of several preselected and appropriate relay circuits 43–49 accordingly. The particular signal, so selected by the classifier, is, as explained, proportioned to the size change in the diameter of the cylindrical product or needle rollers 25. As thus selected, the classified signal is fed to a correction control section 50 which feeds and energizes circuit 51a related to a feed motor 51; a circuit 52a for a magnetic clutch means 52; a circuit 53 for the hammer mechanism 24; and a circuit 54a for a rapid traverse motor 54.

The seven classifier circuits 43 through 49 are set to energize individually at different signal strengths of predetermined value, regulated and preselected according to given size limits for the product. Such selected circuits further energize the feed motor 51 in either forward or reverse directions to move the regulating wheel 17 accordingly, depending on the relation of measured product diameter to a given desired standard.

In addition to the size controls, a feed hopper 55 is equipped with suitable pressure switch means to control circuit 55a associated with control section 50. If the hopper runs empty or below a designated supply limit, the entire operation shuts down until the supply defect is corrected.

In Figure 3, we have illustrated a familiar type of centerless grinding machine equipped with feed control and gauging mechanisms of our invention whereby the same is adapted for the automatic production of needle rollers in the manner outlined hereinbefore. In brief, the grinding machine 15 includes the movable slide head 19 which supports the regulating wheel 17, schematically represented in Figure 1. Wheels 16 and 17 and the head 19 are mounted on a suitable pedestal 56 according to familiar practice. The feed means 22 for torsionally loading the feed screw 21 is located at the left rear corner of the machine 15, as seen in Figure 3. Gauge means 28 is located at the front of the machine at the discharge end of the grinding and regulating wheels. The grinding machine 15 further is equipped with suitable tank means 57 for storing coolant, the same being agitated and circulated by pump means 58. The hopper means 55 is located behind the machine in a position suitable to maintain a steady stream of needle rollers, or the like, advancing between the grinding wheels 16 and 17. A control unit 59 is located near the machine in a convenient location; such housing the amplifier 38, and classifier 42, as well as the visual size meter 39, recorder 40, and plural indicating lamps, the purpose of which will be amplified presently hereinafter.

Turning now to the particular features of the improved feed means 22, as shown in Figures 4 and 5, it will be recognized therefrom that the lead screw 21 is adapted to move the slide 19 along the slide ways 20 under torsional load. Torsional loading of the screw means 21 is carried out by the feed means 22, as will now be described.

Briefly, as best viewed in Figure 4, a special cast bracket housing 60 is attached to the base plate portion 61 between adjacent ways 20, as by plural cap screw means 62, 62, or the like. Housing 60 is suitably cast and adapted to support the feed motor 51 on one wall 63; the same being held by cap screws 64. Motor 51 is preferably a single phase 110 v. A.C., 1/125 H.P. gear motor with a 500:1 reduction ratio which is coupled to the electromagnetic clutch 52. Clutch 52 is joined by a coupling 65 to the shaft 66 of a gear head unit 67 associated with the rapid traverse motor 54. The rapid traverse motor 54 is mounted on side wall 69 of the bracket 60 is coaxial alignment with the shaft 66 of the gear head unit.

Motor 54 comprises preferably a three phase 440 v. A.C., ¼ H.P. gear motor with a 60:1 reduction ratio. An output shaft 70 on the gear reducer unit 67 is connected by coupling means 71 to the feed screw means 21. When circuit is closed to the feed motor 51, the total combined reduction of the feed motor and rapid traverse gear head 67 is 30,000:1.

By suitable circuitry controlled by the classifier control unit 42, as will be described in greater detail hereinafter, relay contacts are closed to energize the direct current circuit for the electro-magnetic clutch 52 which transmits the feed motor output torque to the feed screw 21 via the gear head 67 at a 30,000:1 reduction, as previously related. Suitable cam members in the clutch circuit open and close that circuit to furnish pulsating energy to the clutch, thus applying pulsating torque to the feed screw 21.

Operating in conjunction with the feed motor 51 is the solenoid operated hammer means 24. Hammer means 24, as best seen in Figure 5, comprises an elongated brass or metal bar 75 supported on a set of wheels or rollers 76, 76 which ride freely on the upper surface of the slide ways 20. Bar 75 is connected at one end to a rod 77 at its opposite end to an adjustable bracket means 78. Bracket 78 is pivoted at 79 to the lower arm of a bell crank 80 and provides for the sliding adjustment of rod 77 relative to the crank 80. Bell crank 80 is pivoted on pin means 81 and is pivotally joined adjacent its upper end by pin means 82 to the lower end of a solenoid operated core member 83. Movement of the core member 83 is brought about by energization of a suitable coil 84, according to familiar and known concepts. When the coil 84 is energized, the core member 83 is attracted upwardly to rock the bell crank 80 clockwise about its pivot center 81, thus thrusting rod 77 and attached hammer member 75 forwardly to engage face 85 of the sliding head member 19. This results in a tapping effect on the slide member 19 sufficient to overcome its static frictional resistance to movement along the ways 20.

As in the energization of the feed motor 51, energization of the solenoid 84 is periodic. Suitable return springs (not shown) or gravity are employed to return the hammer to its battery position for subsequent motivation in response to energization of the solenoid coil 84. Energization of the solenoid operated hammer is carried out in response to closure of suitable relay contacts as selected by the classifier section 42. Cam means, similar to that employed in the clutch circuit, serves to periodically open and close the circuit to the solenoid 84 thereby to furnish the necessary pulsating energy. In this manner then, repeated tapping of the slide head 19 is carried out by the hammer mechanism 24.

It will be recalled that periodic energization of the clutch means serves to provide pulsating torque loading of the screw means 21 to gain finer increments of feed and minimization of over-correction. In this latter respect, the movement of the slide head 19 in micro-inch increments is preferably carried out, as above described, by placing a slight pressure on the head through the periodic torque loading of the screw means 21, followed by a periodic tapping of the slide head 19 to break its static friction on ways 20. This operation may also be accomplished by permitting the weight of the slide head 19 to hold the same in a static position on ways 20, with hammer mechanism 24 being used to tap the same into position as called for by the gauge system. It is felt, however, that the latter described operation is more precarious than that employed by our preferred embodiment, as above described, in which we periodically load the torque screw 21 in a pulsating manner accompanied by periodic tapping of the slide head to release its static friction.

While the operation of the feed motor 51 and solenoid operated hammer means 24 is automatic in response to the energization of cooperating circuits controlled by the classifier section 42, the rapid traverse motor 54 is used only occasionally when aligning the machine for initial operation. Although this motor is associated with the automatic feed system, it is normally manually operated by suitable push-button control switches the gear head section 67 being employed in the automatic feed train, as described.

As previously related, the energization of the solenoid operated hammer 24 and the feed means is in response to the energization of a suitable control circuit selected by the classifier section 42. The selection of such circuit is in response to the intensity of the signal transmitted thereto from the amplifier section 38 and as determined by the mechanical response of the sensitive gauge contact 26. In this manner, then, the selection of a given control circuit by the classifier is proportional to diameter or size change of the work item, as measured by the gauge means. In this regard, while we have herein shown gauge means 28 as an electro mechanical type, other gauge systems such as pneumatic, are likewise useful and available for the measuring function of our invention.

Turning now to the particular features of gauge means 28, as seen schematically in Figure 2 and in greater detail in Figures 6 through 9 of the drawings, it will be understood that the gauge means includes the stationary reference contact or anvil 27 carried by a suitable base plate 90 supported on a bracket 91 connected to the grinding machine 15. The reference contact 27 lies in spaced parallelism beneath the movable sensitive contact 26, the latter of which is supported by the pantograph arrangement 30 comprising parallel spaced spring arms 92, 92 which carry an anvil bracket 93 having an adjustable anvil contact 94 at its outer end and responsive with the pantograph leaf springs to the micro-inch movements of the movable contact 26. Contact 26 is adjustable relative to the pantograph support 30 by cap screw means 95, 95 so that such may be positioned to a suitable reference point.

Contact 94 is arranged to engage the movable spindle 31 associated with magnetic coils 32 and 33 housed within the gauge head 34 for operation according to the concepts set forth in United States Patent No. 2,503,851, issued April 11, 1950, to H. A. Snow, entitled "Electrical Gauge." As explained in that patent, axial motivation of the spindle member 31 in response to movement of the contact 26 results in relative movement between magnetic coils 32 and 33. Such sets of coils are so arranged that movement of the spindle member 31 causes like movement of coils 32, 32 relative to the stationary coils 33 and induce thereby a voltage which is proportional to the movement of the spindle. This voltage signal is fed to the amplifier unit 38 where it is magnified to a useful value for driving meters 39 and 40, etc. Since the sensitive contact 26 of the gauge system 28 is constantly engaging a steady stream of the needle rollers 25 passing therebeneath, it will be understood that the signals constantly transmitted to the amplifier, in fact, reflect a median diameter or trend in diameter change for the stream of needle rollers, even though at any given instant the gauge actually measures the diameter of a single needle roller as it moves between contacts 26 and 27.

To provide for the passage of a plurality of needle rollers 25 in a steady stream between the movable and stationary contacts of the gauge system, we have devised a unique feeder tube and guide comprising a cylindrical tube member 100 through which the several tandem related rollers 25 are fed. Opposite the two contacts 26 and 27, the tube 100 is cut away as at 101 so that the same is open at its lower and upper sides for receiving the contacts 26 and 27 inwardly of its diametrical limits. As a result of this arrangement, and as best viewed in Figure 9, needle rollers 25 passing along the tube 100 are engaged across their diameters by the two contacts 26 and 27, as required, without impairing the guiding functioning of tube 100.

In order to facilitate accurate engagement between the contacts 26 and 27 and the exterior of the needle rollers 25, we have also provided, opposite the cutout opening 101, adjacent nozzle means 102 to flush suitable coolant and lubricant across the opening 101 and wash away grit and other foreign material from the rollers 25. While we have herein illustrated anvil-type contacts 26 and 27, other types such as rollers or the like may be employed, although for purposes of the present illustration, we prefer the bar or anvil contacts shown.

As shown in Figure 1, the signal which indicates the diameter of the work pieces is coupled over conductors 36 and 37 to amplifier 38. The function of amplifier 38 is to increase the low level input signal to a usable high output level. Amplifier 38 may comprise a plurality of electron discharge devices to effect such an increase in signal strength in a manner which is well known and understood in the art. Accordingly, a more detailed showing of amplifier 38 is not given herein. The amplified output signal from amplifier 38 is coupled to the visual size meter 39, to recorder 40, and to the classifier unit 42.

The visual size meter may be a current-sensitive device which effects the deflection of a pointer across a scale in proportion to the strength of the signal coupled thereto. The scale may be calibrated in units, such as tenthousandths of an inch or smaller units, so that the deflection of the pointer across the scale is representative of the size of the work pieces as determined by the spacing of contacts 26 and 27 (Figure 2).

Recorder 40 may be a conventional structure to produce a record of the level of the input signals coupled thereto. For example, recorder 40 may include a mechanism for driving a roll of suitably calibrated graph paper under an ink stylus pointer or similar device. An electrical signal may be coupled through a circuit which includes the drive mechanism for the stylus pointer and the graph paper to mark the graph paper as it passes under the pointer. Also included is a mechanism for displacing the pointer to the right or left, as shown in Figure 1, such displacement being proportional to the output signal coupled from amplifier 38 to the recorder unit 40. Such recording devices are commercially available and are well known and understood in the art.

The output signal from amplifier 38 is also coupled to the input circuit of classifier unit 42. Depending upon the strength of the signal coupled to the input side of classifier 42, one of the output circuits 43 through 49 is energized as appropriately predetermined by the input signal strength. It is understood that the showing of the circuits in Figure 1 is schematic only, and reference numerals 43–49 also appear in Figures 10 and 10a to designate the appropriate windings of the relays which are energized in accordance with the level of the signal coupled to the input side of classifier 42.

The output signal fed from amplifier 38 to the input side of classifier 42 may be coupled, as shown in Figure 10, over conductor 110, which may in turn be coupled to shielded conductor 111. Although only a single conductor is indicated in Figure 1, actually the signal is coupled over two conductors 110 and 112, conductor 112 being connected to ground, as seen in Figure 10. Conductors 113–117 may be utilized when the classifier unit 42 is connected to operate in conjunction with one or more additional classifier units. For example, it may be desired to classify the signal level coupled to classifier 42 into more than seven categories. In such event, additional classifier equipment may be coupled in parallel with the circuitry illustrated in Figures 10 and 10a. The connection and operation of such additional circuitry will be apparent to those skilled in the art from the illustrations in the drawings and the subsequent description of the circuitry.

Switch 118 may be in the open position, as shown in Figure 10, when the system is set up for production and before the actual grinding of the work pieces is commenced. When it is desired to utilize classifier unit 42, switch 118 is closed so that an input signal may be coupled over conductors 110 and 111, switch 118, and resistor 119 to the control grid 120 of a cathode follower stage 121. The anode 122 of cathode follower 121 is coupled through a resistor 123 and conductor 123a to conductor 115, which in turn is coupled to a source of unidirectional operating potential. The filament circuit of tube 121 is represented generally as 124, being connected across the secondary winding 125 of filament transformer 126 (Figure 10a). The primary winding 127 of transformer 126 may be connected to a source of alternating potential in a manner well known and understood in the art. The filament circuits of the remaining electronic tubes shown in Figures 10 and 10a are connected in a manner similar to that of tube 124 and, accordingly, such circuits will not be described.

The output signal from cathode follower 121 is coupled over conductor 129 to one side of each of the grid resistors 131–137, inclusive. The other sides of each of resistors 131–137 are individually connected to the control grids of Thyratron tubes 141–147, respectively. The circuit conditions which are required to cause one of the Thyratron tubes to conduct and the resultant circuit operation will now be described. Because the operating circuitry is substantially the same for each of the Thyratrons, the circuitry associated with the tube 143 will be considered during the following description of the circuit.

Let it be assumed that a signal of a particular level is coupled to the input connection of classifier 42 through the cathode follower stage 121 to conductor 129. This signal is coupled through grid resistor 133 to the control grid of tube 143. The potential applied to the cathode of tube 143 is determined by the setting of the movable arm 151 of potentiometer 150. It is apparent that a certain potential is coupled from conductor 115 over resistor 152, through the movable arm 151 and the upper portion of potentiometer 150, to the cathode of Thyratron tube 143. When the grid potential applied through resistor 133 exceeds the positive potential coupled through potentiometer 150 to the cathode of Thyratron by a predetermined amount, tube 143 fires (that is, the gas contained therein is ionized and the tube becomes conductive) and the grid circuit loses control. An intermittent positive potential, which may, for example, be the positive half-cycles of an alternating-current wave form, is applied to the anode of tube 143 from conductor 113, over the series of normally closed contacts shown in this conductor, through the winding of relay 45, to the anode of tube 143. Thus, when the next positive pulse is applied to the anode of tube 143 (after the requisite potential has been applied to its control grid), the tube fires and relay 45 is energized. After the operations effected by relay 45, and responsive to the removal of the positive potential from the anode of tube 143, this Thyratron tube will cease conducting and the grid circuit again will be conditioned to initiate conduction of the tube.

As relay 45 operates, contacts 45A and 45C open, and contacts 45B and 45D close. Opening contacts 45A preclude the possibility of coupling the intermittent positive operating potential to the anodes of tubes 141 and 142. In this manner, the input signal of a certain level will operate only a particular Thyratron tube. The signal level in the present instance is insufficient to operate any of the tubes 144–147, and energization of the relay 45 by the firing of tube 143 opens contacts 45A to insure that neither tube 141 nor tube 142 conducts during this interval.

When contacts 45B close, such complete an energizing path for the neon lamp 153; this path extending from ground through lamp 153, resistor 154, contacts 45B, to the positive potential applied to conductor 113. Accordingly, neon lamp 153 is illuminated to indicate that Thyratron tube 143 is conducting and relay 45 is energized.

Closure of contacts 45B also completes an energizing circuit for relay 155, this circuit extending from ground over the winding of relay 155, resistor 156, contacts 45B, to the positive potential applied to conductor 113, Relay 155 operates and opens contacts 155A. Thus, the operation of relay 155 effects disconnection of conductor 113 at another point to insure that tube 141 cannot conduct. Operation of relay 155, therefore, affords a measure of safety in the event that for some reason contacts 45A fail to open in response to the energization of relay 45. Relays 157–160, associated with several Thyratron stages 144–147, respectively, perform similar functions to the aforedescribed when energized.

Closure of contacts 45D, responsive to energization of relay 45, is effective to couple conductors 163 and 164, as illustrated in Figure 10 and in more detail in Figure 11. It is to be noted in Figures 10 and 10a, that operation of each of relays 43–45 and 47–49 is effective to close a set of contacts, which contact closure is signaled to the appropriate points in the control circuit of Figure 11.

Responsive to the operation of relay 46, however, a signal indicative of the opening of contacts 46C appears by effective disconnection of conductor 165 from 166 at these contacts. It will be observed further from the showing of Figures 10 and 10a that the relays 44 and 45, energized to indicate an undersize condition in the work, are connected in parallel to couple a signal over conductors 163 and 164 when this undersize condition occurs. Similarly, the output signal from the operated contacts of relays 47 and 48 is coupled over conductors 163 and 167 to indicate an oversize condition in the work. It will be recognized that the contacts of these relays can be connected over separate lines to the different portions of the correction control circuit 50, depending upon the desired operation of the inventive structure.

It is thus apparent that a signal of a certain level is coupled to the input side of classifier 42, shown in Figures 10 and 10a. Such signal is effective to overcome the the bias level of a preselected Thyratron tube, which in its operation is effective to operate a set of contacts and signal this operation over appropriate conductors to the correction control circuit shown in Figure 11. The operation of associated contacts is also performed by the conduction of the same Thyratron tube to insure that one and only one signal is coupled from the classifier circuit 42 responsive to a single input signal. It will be recalled that the general illustration in Figure 1 of a plurality of connections from the output side of classifier 42 to correction control circuit 50 is illustrative only. From the description of the control circuit 50 in Figure 11, considering the relay contacts which have been operated by reason of the energization of one of the relays 43–49 in Figures 10 and 10a, the operation and control of various components of the structure shown in Figure 11 will be understood.

When a particular work piece is measured and its diameter is of exactly the right size, a certain signal is coupled to classifier 42 and relay 46 is energized in response to the conduction of Thyratron tube 144. As the work pieces go undersize, relays 45, 44, and 43 are progressively energized to indicate the increasing departure from the preferred diameter. In a similar manner, as a departure from the desired diameter is measured in the opposite direction, relays 47, 48, and 49 are progressively energized to indicate the increasing diameter trend of the measured work pieces. In the illustrated embodiment of the inventive structure, the output indications from relays 44 and 45 are connected in parallel, and the output indications from relays 47 and 48 are similarly parallel. If a more substantial error occurs and the departure from the preferred diameter increases beyond the limits of tolerance, relay 43 is energized to indicate such a departure in the undersize direction, while relay 49 is energized to indicate the departure of the diameter beyond the upper control limits for the particular piece.

Closing switch 170 couples energy from a source of power (not shown) over conductors 171, 172, and 173 to the primary winding of a power transformer 174 (see Figure 11). The secondary winding 174a of transformer 174 is coupled through suitable fuse members 175 and 176 to conductors 166 and 177. Thus, the potential appearing across the secondary winding of transformer 174 also appears between conductors 166 and 177. From Figures 10 and 10a, it will be seen that energization of either relay 43 or relay 49 results in the closure of contacts 43D or 49D to produce interconnection of conductors 161 and 162. When either relay 43 or 49 is energized, a relay 178 (Figure 11) is energized over a circuit including conductor 166, the winding of relay 178, either contacts 43D or 49D, conductor 162, the normally closed contacts 179, and conductor 177. Relay 178 operates contacts 180 and contacts 181. Closing contacts 180 forms an effective holding circuit for relay 178, such being connected in parallel with contacts 43D and 49D, while opening contacts 181 interrupts a control circuit, as will now be described.

Responsive to the closure of switch 170, an alternating potential is coupled through transformer 174, fuses 175 and 176, and conductors 166 and 167, to the primary winding of transformer 182. In the secondary circuit of transformer 182 is a series connection between a hopper pressure switch 183 and a relay 184. Hopper pressure switch 183 is closed when sufficient pieces are present in the feed hopper 55 (Figure 1). Accordingly, when a desired minimum number of work pieces are in feed hopper 155 and switch 170 (Figure 11) is closed, relay 184 is energized to effect closure of contacts 185 and to open contacts 186. Figure 11 also shows a manual switch 187 which is effective, responsive to depression by the operator to signal that the operator desires the assistance of a set up man. Switch 187 includes a set of normally open contacts 188 and normally closed contacts 189.

Also illustrated in Figure 11 is an indicator light 190 which may, for example, be a green light to indicate that the structure of the invention is functioning properly within the preassigned tolerances. The green light 190 is energized over a circuit including conductor 166, the light 190, contacts 185 (which indicate that a sufficent amount of material is in the hopper), contacts 181 (which indicate that the work is being formed within the desired tolerances), contacts 189 (which indicate that the assistance of a set up man is not required), and conductor 177. When either relay 43 or 49 is energized to indicate that the work has exceeded the preassigned tolerances, relay 178 is energized to open contacts 181 and deenergize above-described operating circuit for green light 190. The green light may be extinguished also in response to the actuation of manual control switch 187. Actuation of switch 187 also closes contacts 188 and energizes a blue signal light 191 over an obvious operating circuit to indicate that the assistance of a set up man is required. A yellow light 192 is indicative, when illuminated, that more stock is required in hopper 55. As the supply of stock diminishes in the hopper 55, the hopper pressure switch 183 is opened, opening contacts 183 and deenergizing relay 184. Contacts 186 are thus closed and the energizing circuit for yellow indicating light 192 is completed over conductor 166, light 192, contacts 186, and conductor 177. When the supply of raw stock in the hopper is replenished, contacts 183 are closed and the yellow light 192 is extinguished.

A selector switch 193 is shown in the "off" position in Figure 11 with switch arm members 194 and 195 engaging contacts 196 and 197. Switch arms 194 and 195 are ganged together for simultaneous movement. When these arms are moved to engage contacts 198 and 199, the selector switch is conditioned for manual operation of the control circuit, as when initially "setting up." When switch arms 194 and 195 are displaced upwardly to engage contacts 200 and 201, the circuitry is conditioned to effect automatic operation of the centerless grinding machinery.

In the "automatic" position, for example, an energizing circuit for hopper motor 202 is completed, which circuit extends from conductor 166, over motor 202, switch arm 194, contacts 200, normally closed contacts 203 of relay 178, and conductor 177. The feed motor 51 is energized over a circuit extending from conductor 166, over contacts 46C, conductor 165, motor 51, contacts 204, conductor 163, the normally closed contacts 206 of relay 178, contacts 201, and switch arm 195 to conductor 177. It will be noted that when the limits of tolerance are exceeded, relay 178 is energized and opens contacts 203 and 206, thereby disabling both the hopper motor 202 and feed motor 51. After a suitable compensating correction is made in the feed mechanism, the restart button 179 may be manually depressed to open the holding circuit of relay 178, thus conditioning the control circuit of Figure 11 for operation.

Relay 207 is a direction sensing relay. When de-energized, as shown in Figure 11, its associated contacts 204 and 208 are closed and contacts 205 are open. In this condition, the feed motor 51 is connected to move the regulating wheel 17 in a forward direction for "in" feed. When relay 207 is energized to call for "out" feed, contacts 204 and 208 are opened and contacts 205 are closed. This reverses the rotational direction of the feed motor 51. As will become apparent from subsequent explanation of the circuit for energizing the hammer means 24, opening of contacts 208 disables the hammer mechanism.

When relay 207 is de-energized, the feed motor 51 will drive the regulating wheel 17 in the "in feed" direction if either relay 47 or 48 is energized to signal for "in" feed. When either relay 47 or 48 is operated, their respective contacts 47D or 48D will be closed, thus completing an operating circuit for the feed motor 51; such circuit extending from conductor 166 over contacts 46C, conductor 165, feed motor 51, the normally closed contacts 204 of relay 207, conductor 163, the normally closed contacts 206, contacts 201 and switch arm 195 to conductor 177.

However, when either relay 44 or 45 is energized to call for an "out" feed, the contacts 44D or 45D of the appropriate relay are closed to complete the energizing circuit for reversing relay 207. Such energizing circuit extends from conductor 166 over the winding of relay 207, conductor 211, the operated ones of contacts 44D or 45D, conductor 163, normally closed contacts 206, contacts 201, and switch arm 195 to conductor 177. Relay 207 then operates to close contacts 205 and open contacts 204 thereby reversing the direction of feed motor 51. Relay 207 is also effective to open the normally closed contacts 208 and thus disable the hammer mechanism in this condition.

The "automatic" position of the selector switch 193 has been described. When the control system of our invention is being adjusted, prior to automatic operation, selector switch 193 may be placed in the "set up" position by throwing switch arms 194 and 195 appropriately to engage contacts 198 and 199, respectively. In this position, an obvious circuit is completed for energizing hopper motor 202 over relay arm 194 and contacts 198. Thus, hopper motor 202 will run whether or not the work pieces have diameters which fall within the preselected tolerance limits imposed upon the work. The feed motor 51 will also continue to run over an obvious energizing circuit including switch arm 195 and contacts 199 until the correct size of the machine parts is obtained. When the exact diameter required is obtained, relay 46 (Figure 10a) will be energized and contacts 46C (Figure 11) will be opened, thus disabling feed motor 51. At this time the selector switch 193 can be displaced to the "automatic" position in which the control circuit of Figure 11 is selectively controlled by the operation of relays 43–49, inclusive.

When any of relays 44, 45, 47, or 48 is energized, the clutch relay 212 is also energized. For example, when the relay 44 is energized, relay 212 is energized over a circuit extending from conductor 166 over the winding of relay 211, contacts 210 (operated by relay 207), conductor 164, contacts 44D, conductor 163, contacts 206, contacts 201 and switch arm 195 to conductor 177. The other operating circuits which are completed responsive to the closure of contacts 45D, 47D, or 48D, are similar to and apparent from the foregoing description. Thus, responsive to energization of any of the selected relays 44, 45, 47, or 48, relay 212 is operated and in turn is effective to close contacts 213 in the clutch circuit. The clutch arrangement is connected between the feed motor 51 and the machine feed screw 21 and is energized in response to the closure of the contacts 213.

In the clutch circuit (Figure 11) a D.-C. rectifier circuit 214 is connected between conductors 166 and 177. The output D.-C. signal from rectifier circuit 214 is coupled over conductors 215 and 216. The energizing D.-C. circuit for magnetic feed clutch 52 extends from conductor 215 through clutch mechanism 52, over the normally closed contacts 217 of push button switch 218, the normally closed contacts 219 of push button switch 220, switch arm 221 and contacts 222 of the feed rate switch 223, cam operated contacts 224, and contacts 213 to conductor 216.

When the switch arm 221 is displaced to engage contacts 225 of the feed rate switch 223, the energizing circuit for feed clutch 52 is then completed over switch arm 221, contacts 225, a second set of cam operated contacts 226, and contacts 213. When the switch arm is displaced to engage contacts 227, the feed clutch energizing circuit is completed over contacts 227, and the contacts 213.

The cam operated contacts 224 and 226 are intermittently opened and closed by cam members driven by the pulser motor 228, which is connected between conductors 166 and 177. When the switch arm 221 of the feed rate switch is connected directly to contacts 227, it is apparent that a constant energization is supplied to feed clutch 52, thereby giving a more rapid rate of feed for the mechanism. When switch arm 221 is displaced to engage contacts 225, the cam contacts 226 are periodically opened by pulser motor 228 to give feed clutch 52 a pulsing action. Similarly, when switch arm 221 is displaced to engage contacts 222, the pulsing action is determined by cam contacts 224; such providing a shorter energizing time for feed clutch 52 than is provided by contacts 226.

It will be recalled that the hammer mechanism 24 is driven to periodically tap the slide head 19 and overcome its static frictional engagement with the slide ways 20. This energization of the hammer mechanism 24 is timed with the periodic operation of the feed clutch 52. It is to be noted that another set of cam operated contacts 229, also driven by pulser motor 228, is connected in a series energizing circuit for the hammer energizing relay 230 to accomplish this function.

The circuit for energizing relay 230 extends from conductor 166 over the winding of relay 230, through the effective portion of potentiometer 231, fixed resistor 232, contacts 229, and the normally closed contacts 208 of reversing relay 207 to the classifier contacts. Because the current flowing through the series circuit including relay 230 may be regulated by setting the movable arm of potentiometer 231, it is apparent that such setting may be varied to regulate the intensity of the hammer blow. Contacts 208 are normally closed when the classifier relays 47 or 48 call for feed in the "in" direction and relay 207 is de-energized at this time. Responsive to energization of reversing relay 207, contacts 208 open and disable the hammer energizing circuit.

It may be desired, during "set up" or adjustment of the control system, to drive the feed screw 21 at a much more rapid rate than is possible with the feed motor 51 and feed clutch 52. To provide for rapid adjustment, the rapid traverse push buttons 218 and 220 are included in the correction control circuit of Figure 11. The rapid traverse push button 220, for example, provides for a rapid traverse in the "in" direction. Actuation of this push button opens contacts 219, thereby disabling the circuit for feed clutch 52, and closes contacts 233. Closure of contacts 233 completes an energizing circuit for the rapid traverse "in" relay 234, which circuit extends from conductor 166 over the normally closed contacts 235 and 236, the winding of relay 234, contacts 233, and the normally closed contacts 237 of a manual feed switch 238 to conductor 177. Relay 234 operates to effect closure of contacts 239, 240, and 241, thereby energizing the rapid traverse motor 54. Rapid traverse in the "out" direction is effected by actuating the rapid traverse push button 218 which opens contacts 217 to de-energize feed clutch 52, and closes contacts 242. The rapid traverse "out" relay 243 is then energized over an obvious circuit to close contacts 244, 245, and 246 and produce rapid traverse feeding in an "out" or reverse direction.

To move the feed screw 21 for a major correction, the manual feed "in" button 247 and the manual feed "out" button 238 are provided. For example, when the "in" manual feed button 247 is depressed, contacts 248 are closed to complete an obvious energizing circuit for the feed motor 51. Contacts 249 are opened, thereby disabling the rapid traverse "in" circuit including push button control 220. Closure of contacts 250 completes an energizing circuit for relay 212 and closure of the lower set of contacts 251 effectively connects a holding circuit around contacts 213, thereby holding the clutch 52 energized. The operation of the "out" manual feed button 238 to open contacts 237 and close contacts 252, 253, and 254 accomplishes functions similar to those described in connection with push button 247, except that the direction of the feed motor 51 is reversed, thereby driving it in an "out" direction.

The various indications of the lights 190, 191, and 192 have been set forth above. In addition to these basic indicators, a red light 255 is coupled to conductor 166 and through the normally open contacts 256 of relay 178 to conductor 177. Relay 178 is energized, as previously related, whenever either relay 43 or 49 is energized to indicate that the work pieces have acquired dimensions which are not within the limits of tolerance. Accordingly, energization of relay 178 under these conditions will close contacts 256 to cause the illumination of the red light 255, indicating to the operator that the mechanism requires adjustment.

From the foregoing, those familiar in the art will recognize that, while we have herein described our advancement in conjunction with a preferred embodiment thereof, certain changes, modifications and substitutions of equivalents may be made therein without necessarily avoiding our invention. Consequently, it is not our intention to be limited by the particulars of the mechanism described, except as may appear from the following appended claims.

We claim:

1. A control system in combination with a centerless grinding machine to maintain product diameters within predetermined limits, the machine having a grinding wheel and a regulating wheel movable relative thereto and means for so moving the regulating wheel, comprising, gauge means for measuring the diameter of parts emerging from between the grinding and regulating wheels, signal generating means operated by said gauge means for generating electrical signals of magnitudes proportional to changes in part diameters from a preselected standard size, means coupled to said signal generating means for classifying said generated signals according to their magnitudes, plural circuit means controlled by said classifying means and each individually operated by said generated signals of preselected classification, feed means operated by certain of said circuit means to operate the means for moving the regulating wheel to adjust the spacing between the grinding and regulating wheels and correctively alter the diameter of parts ground therebetween as indicated by the classification of the generated signals, and additional means operable in conjunction with said feed means for releasing static resistance to movement of said regulating wheel relative to said grinding wheel.

2. The combination as set forth in claim 1 in which said regulating wheel is carried by head means slidable on ways, and said additional means comprises a solenoid operated hammer member periodically operated in response to said generated signals to strike said head means and release its static friction with said waves.

3. The combination of a control system and a centerless grinder in which said control system automatically regulates the diameter of cylindrical parts produced between grinding wheels in a centerless grinder, the grinder having a feed screw means for regulating the spacing between grinding wheels, comprising, gauge means having a displaceable detecting means engageable with the exterior of parts emerging from between the wheels of the grinder, electro-magnetic means generating electrical signals of a magnitude proportional to the mechanical displacement of said detecting means, means coupled to said signal generating means for classifying such signals according to preselected values of magnitude, feed control means operating the feed screw means of the grinder for automatically adjusting the spacings between the wheels of the grinder, operation of said feed control means being determined by and according to the value of said classified signals thereby to operate the feed screw means appropriately to compensate for diameter change in the parts as detected by said gauge means, hopper means for continuously feeding raw work parts to the grinding wheels, and circuit means operatively controlled by the classifying means for interrupting the feeding of parts from said hopper means when the diameter of produced parts as detected by said gauge means meets predetermined limits.

4. In combination with a centerless grinding machine having a grinding wheel and a regulating wheel between which parts advance and means for positioning the regulating wheel relative to the grinding wheel, the improvement which includes a control system for automatically maintaining product diameter within predetermined limits comprising: gauge means positioned to measure the diameters of parts as they emerge from the grinding machine; means operated by said gauge means for generating electrical signals having intensity levels proportional to the change of part diameter from a preselected standard value; classifying means coupled to said signal generating means including a plurality of signal-translating devices, only one of said signal-translating devices being operated responsive to receipt of a signal of any selected intensity level; plural circuit means, each of which is energized selectively in response to operation of one of said signal-translating devices; and feed means coupled to certain of said plural circuit means for operation thereby to position said regulating wheel as indicated by the operated signal-translating device to correctively alter the diameter of parts.

5. The combination of claim 4 in which said classifying means further includes circuit means for applying an operating potential to each of said signal-translating devices, a first plurality of relays, each relay having a winding connected between an associated one of said signal-translating devices and said circuit means and having a first contact set connected to interrupt said circuit means adjacent said winding, whereby application of a signal of a level sufficient to operate a given number of said signal-translating devices is effective to operate one of said devices and simultaneously energize its associated relay to interrupt the application of operating potential to the remainder of said given number of devices to insure that only one signal-translating device is operated for any level of input signal applied thereto.

6. The combination of claim 5 in which each of said first relays includes a second contact set connected to energize the winding of an associated one of a second plurality of relays, each of said second relays having a contact set series-connected with the first contact set of its associated first relay to provide additional protection against the undesired operation of additional signal-translating devices, and a plurality of indicating means connected for selective operation with said second relays to denote which of said signal-translating devices is operated.

References Cited in the file of this patent

UNITED STATES PATENTS

| | | |
|---|---|---|
| 1,891,662 | Booth et al. | Dec. 20, 1932 |
| 2,042,257 | Harrison et al. | May 26, 1936 |
| 2,503,851 | Snow | Apr. 11, 1950 |
| 2,692,457 | Bindszus | Oct. 26, 1954 |